(12) United States Patent
Fryer et al.

(10) Patent No.: US 12,514,945 B2
(45) Date of Patent: Jan. 6, 2026

(54) ADJUSTING STERILIZATION CYCLES BY IMAGING LOADS

(71) Applicant: Advanced Sterilization Products, Inc., Irvine, CA (US)

(72) Inventors: Benjamin M. Fryer, Lake Forest, CA (US); Ali S. Siddiqui, Orange, CA (US); Fong Shyr Yang, Irvine, CA (US); Todd Morrison, Dana Point, CA (US)

(73) Assignee: Advanced Sterilization Products, Inc., Irvine, CA (US)

( * ) Notice: Subject to any disclaimer, the term of this patent is extended or adjusted under 35 U.S.C. 154(b) by 692 days.

(21) Appl. No.: 17/770,967

(22) PCT Filed: Oct. 22, 2020

(86) PCT No.: PCT/IB2020/059913
§ 371 (c)(1),
(2) Date: Apr. 21, 2022

(87) PCT Pub. No.: WO2021/079296
PCT Pub. Date: Apr. 29, 2021

(65) Prior Publication Data
US 2022/0387649 A1 Dec. 8, 2022

Related U.S. Application Data

(60) Provisional application No. 62/924,710, filed on Oct. 23, 2019, provisional application No. 62/955,144, filed on Dec. 30, 2019.

(51) Int. Cl.
*A61L 2/08* (2006.01)
*A61L 2/20* (2006.01)
(Continued)

(52) U.S. Cl.
CPC .......... *A61L 2/24* (2013.01); *A61L 2/208* (2013.01); *A61L 2202/122* (2013.01); *A61L 2202/14* (2013.01); *A61L 2202/24* (2013.01)

(58) Field of Classification Search
CPC ... A61L 2/24; A61L 2/208; A61L 2/20; A61L 2/14
(Continued)

(56) References Cited

U.S. PATENT DOCUMENTS 7,811,530 B2   10/2010   Morrison
2008/0193337 A1   8/2008   Ongaro et al.
(Continued)

FOREIGN PATENT DOCUMENTS

CN   203634532 U   6/2014
CN   206979752 U   2/2018
(Continued)

OTHER PUBLICATIONS

Chinese Search Report for CN Application No. 202080074150.0 dated Sep. 29, 2024, 2 pages.
(Continued)

*Primary Examiner* — Monzer R Chorbaji
(74) *Attorney, Agent, or Firm* — Lerner David LLP

(57) ABSTRACT

A method of operating a sterilizer includes imaging a load of instruments to obtain an optical image and/or thermal image of the load, and selecting a sterilization cycle to be performed by the sterilizer based on one or more characteristics of the load determined from the image of the load. The characteristics may include the number of instruments, the presence of a diffusion-restricted space, the volume of the load, and the temperature of the load. The method may further include adjusting the sterilization cycle based on the characteristics of the load.

20 Claims, 5 Drawing Sheets

(51) Int. Cl.
  *A61L 2/24* (2006.01)
  *G01D 11/26* (2006.01)
  *G05B 1/00* (2006.01)
(58) Field of Classification Search
  USPC .......................................... 422/26, 105, 119
  See application file for complete search history.

(56) References Cited

U.S. PATENT DOCUMENTS

| | | |
|---|---|---|
| 2009/0283517 A1 | 11/2009 | Mackay et al. |
| 2017/0252473 A1 | 9/2017 | Thompson et al. |
| 2017/0252474 A1* | 9/2017 | Thompson ............. G16H 40/63 |
| 2018/0000976 A1 | 1/2018 | Nowruzi et al. |

FOREIGN PATENT DOCUMENTS

| | | |
|---|---|---|
| CN | 110301977 C7 | 10/2019 |
| EP | 1016421 B1 | 8/2005 |
| JP | 2017-153966 A | 9/2017 |
| WO | 2021/079296 | 4/2021 |

OTHER PUBLICATIONS

Supplementary Partial European Search Report issued in Appln. No. 20879348.9 dated Feb. 13, 2024 (19 pages).
PCT International Search Report for International Application No. PCT/IB2020/059913, dated Feb. 1, 2021, 4 pages.
Search Report dated Feb. 27, 24 from Office Action for Chinese Application No. 202080074150.0 issued Feb. 28, 2024. 2 pgs.

* cited by examiner

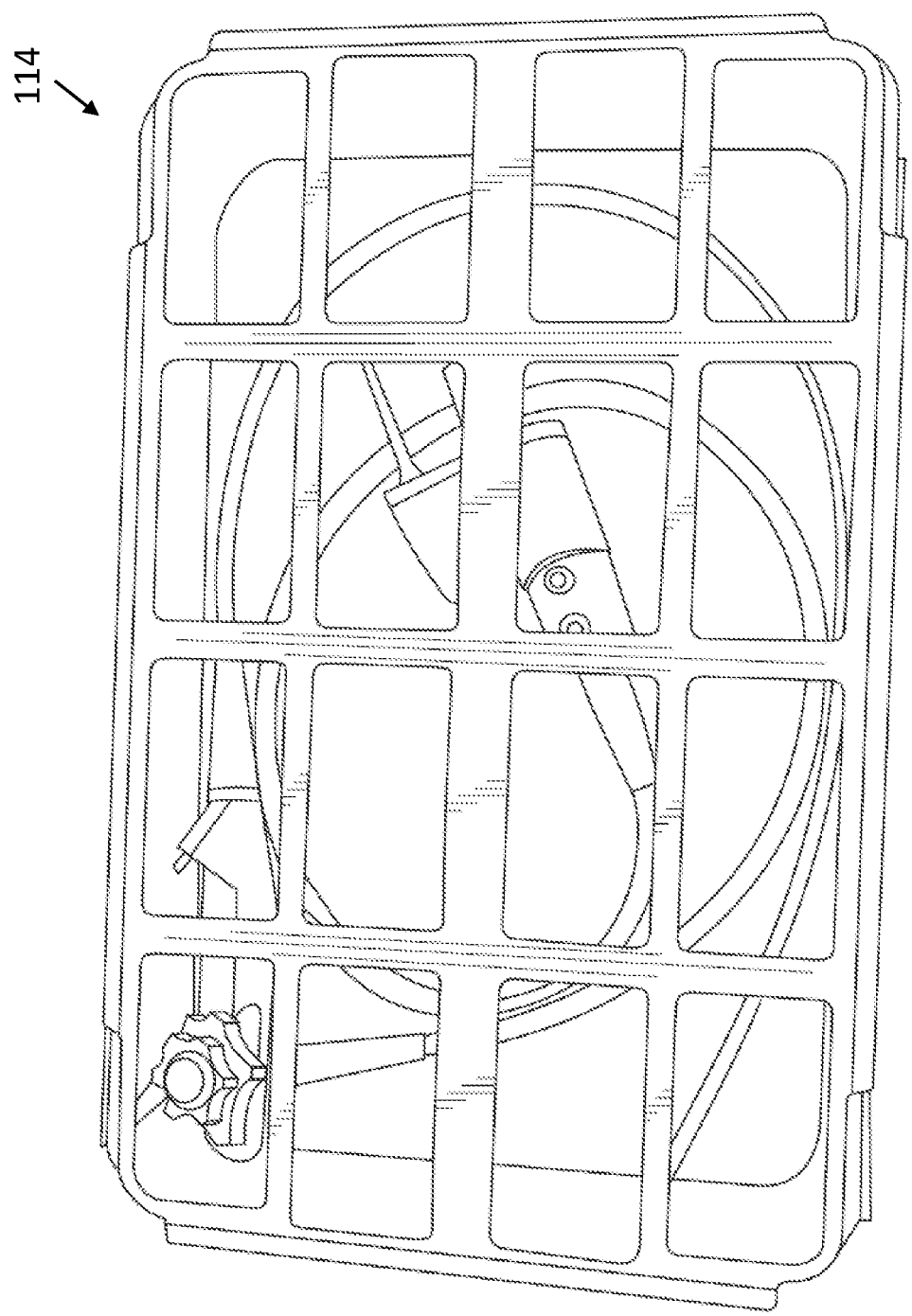

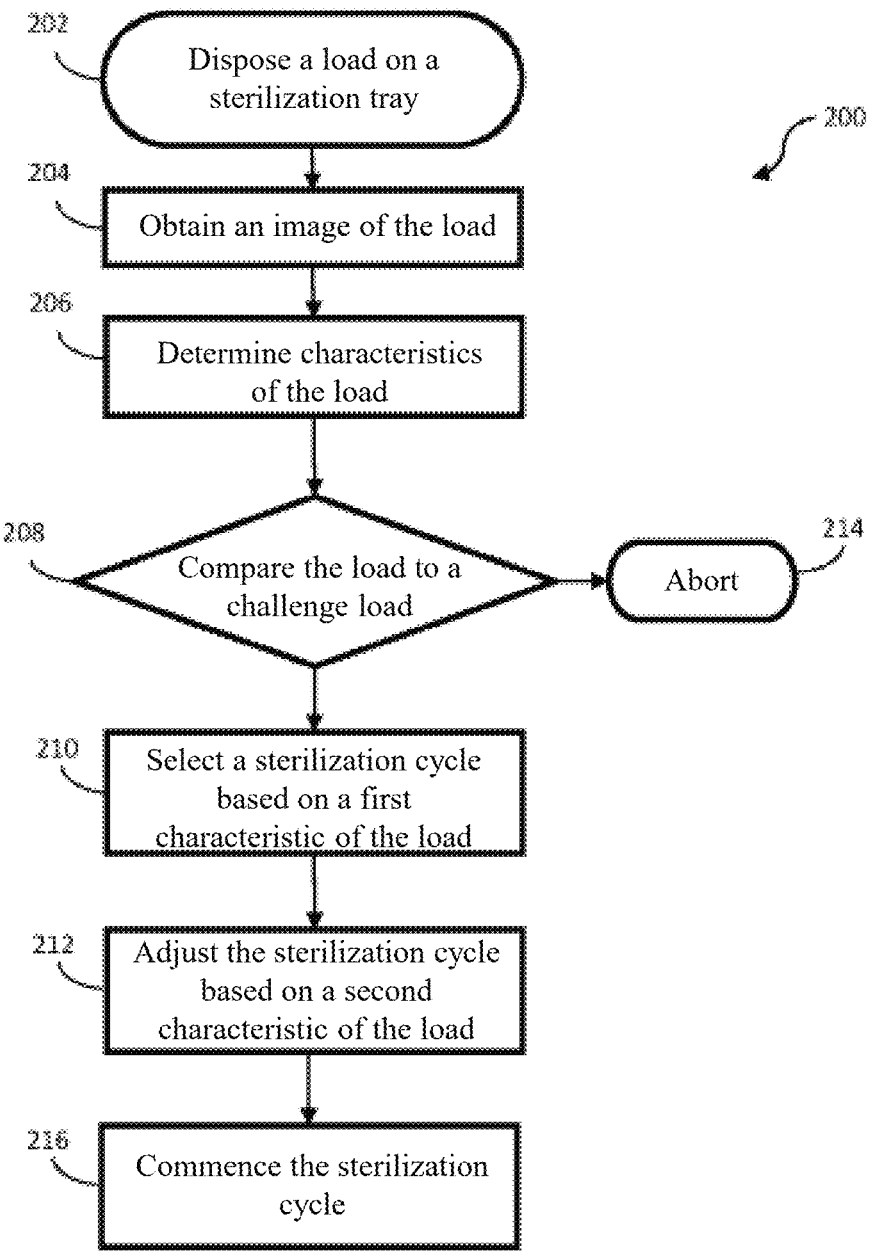

ADJUSTING STERILIZATION CYCLES BY IMAGING LOADS

CROSS-REFERENCE TO RELATED APPLICATIONS

The present application is a U.S. National Phase Application of International Application No. PCT/IB2020/059913, filed Oct. 22, 2020, which claims priority to U.S. Provisional Patent Application No. 62/955,144, filed Dec. 30, 2019, and U.S. Provisional Patent Application No. 62/924,710, filed Oct. 23, 2019. The entire contents of these applications are incorporated by reference herein in their entirety.

FIELD

The subject matter disclosed herein relates to sterilization of instruments in a vacuum or sterilization chamber using a sterilant.

BACKGROUND

Medical devices or instruments are typically sterilized before use to minimize the likelihood that a contaminated device might be used on a subject, which could cause an infection in the subject. Various sterilization techniques may be employed using various sterilants, such as steam, hydrogen peroxide, and vapor phase sterilization, either with or without a gas plasma, and ethylene oxide (EtO).

Certain sterilization techniques are conducted at pressures other than ambient pressure or atmospheric pressure. For example the STERRAD® System, STERRAD® NX System or STERRAD® 100NX System of Applicant are examples of sterilization systems, or sterilizers, that include a vacuum chamber and operate at low pressures, e.g., down to about 0.2 torr, which helps to vaporize hydrogen peroxide injected into the vacuum chamber as a liquid, to maintain hydrogen peroxide in gaseous form, and to avoid condensation of this sterilant onto the instruments being sterilized. Various sterilizers, e.g. the aforementioned STERRAD® systems, are capable of monitoring various process parameters to determine that process goals and thresholds are satisfied to help ensure that medical devices are sterilized or to notify personnel of a process error, which may indicate that the instruments have not been sterilized. One process parameter is the volumetric concentration of a sterilant, e.g., hydrogen peroxide, in the vacuum chamber. These systems each monitor the concentration of hydrogen peroxide to ensure that a minimum concentration is achieved over time. Specifically, the STERRAD® systems monitor the concentration of hydrogen peroxide as a function of time, and when the integral of this concentration with respect to time, sometimes referred to as the Area Under the Curve, or AUC, surpasses a predetermined threshold, the sterilization process may continue. However, if this AUC threshold is not met, the system may abort the process.

When the AUC threshold is not met, condensation of the hydrogen peroxide may be the cause. Various factors may contribute to condensation of the hydrogen peroxide, including available volume in the chamber (i.e., the volume not occupied by the instruments) and the temperature of the instruments. That is, if the instruments occupy a substantial portion of the chamber, the temperature of the instruments is too low, or a combination thereof, the hydrogen peroxide vapor may condense. As such, the STERRAD® systems check to ensure that a minimum AUC threshold is achieved, which provides an assurance that condensation did not substantially occur and that sterilization procedure was efficacious (i.e., that the instruments were sterilized).

SUMMARY OF THE DISCLOSURE

A method of operating a sterilizer is disclosed. The method includes imaging a load of instruments to obtain an optical image and/or thermal image of the load, and selecting a sterilization cycle to be performed by the sterilizer based on a first characteristic of the load determined from the image of the load. The first characteristic of the load may comprise the load including between one and ten instruments, such that the load includes a first instrument. Additionally, the first characteristic of the load may comprise the first instrument having a diffusion-restricted space, e.g., a lumen.

The method may further include adjusting the sterilization cycle based on the first characteristic of the load. For example, the duration of the cycle may be adjusted to a duration different than a default duration. Alternatively, the method may include a step of aborting the cycle if the system determines from the first characteristic of the load that the load comprises greater than a maximum number of instruments.

The method may further include determining a second characteristic of the load, e.g., a volume of the load, and adjusting the duration of the cycle or an amount of sterilant based on the volume of the load. The method may further include determining a third characteristic of the load, e.g., a temperature of the load, and adjusting the duration of the cycle or an amount of sterilant based on the temperature of the load.

BRIEF DESCRIPTION OF THE DRAWINGS

While the specification concludes with claims, which particularly point out and distinctly claim the subject matter described herein, it is believed the subject matter will be better understood from the following description of certain examples taken in conjunction with the accompanying drawings, in which like reference numerals identify the same elements and in which:

FIG. 4 depicts a load of instruments to be sterilized in the sterilizer; and FIG. 5 depicts a flow chart for a method of using the sterilizer.

MODES OF CARRYING OUT THE INVENTION

The following detailed description should be read with reference to the drawings, in which like elements in different drawings are identically numbered. The drawings, which are not necessarily to scale, depict selected embodiments and are not intended to limit the scope of the invention. The detailed description illustrates by way of example, not by way of limitation, the principles of the invention. This description will clearly enable one skilled in the art to make and use the invention, and describes several embodiments, adaptations, variations, alternatives and uses of the invention, including what is presently believed to be the best mode of carrying out the invention.

As used herein, the terms "about" or "approximately" for any numerical values or ranges indicate a suitable dimensional tolerance that allows the part or collection of components to function for its intended purpose as described herein. More specifically, "about" or "approximately" may refer to the range of values ±10% of the recited value, e.g. "about 90%" may refer to the range of values from 81% to 99%. In addition, as used herein, the terms "patient," "host," "user," and "subject" refer to any human or animal subject and are not intended to limit the systems or methods to human use, although use of the subject invention in a human patient represents a preferred embodiment.

Figure 1:
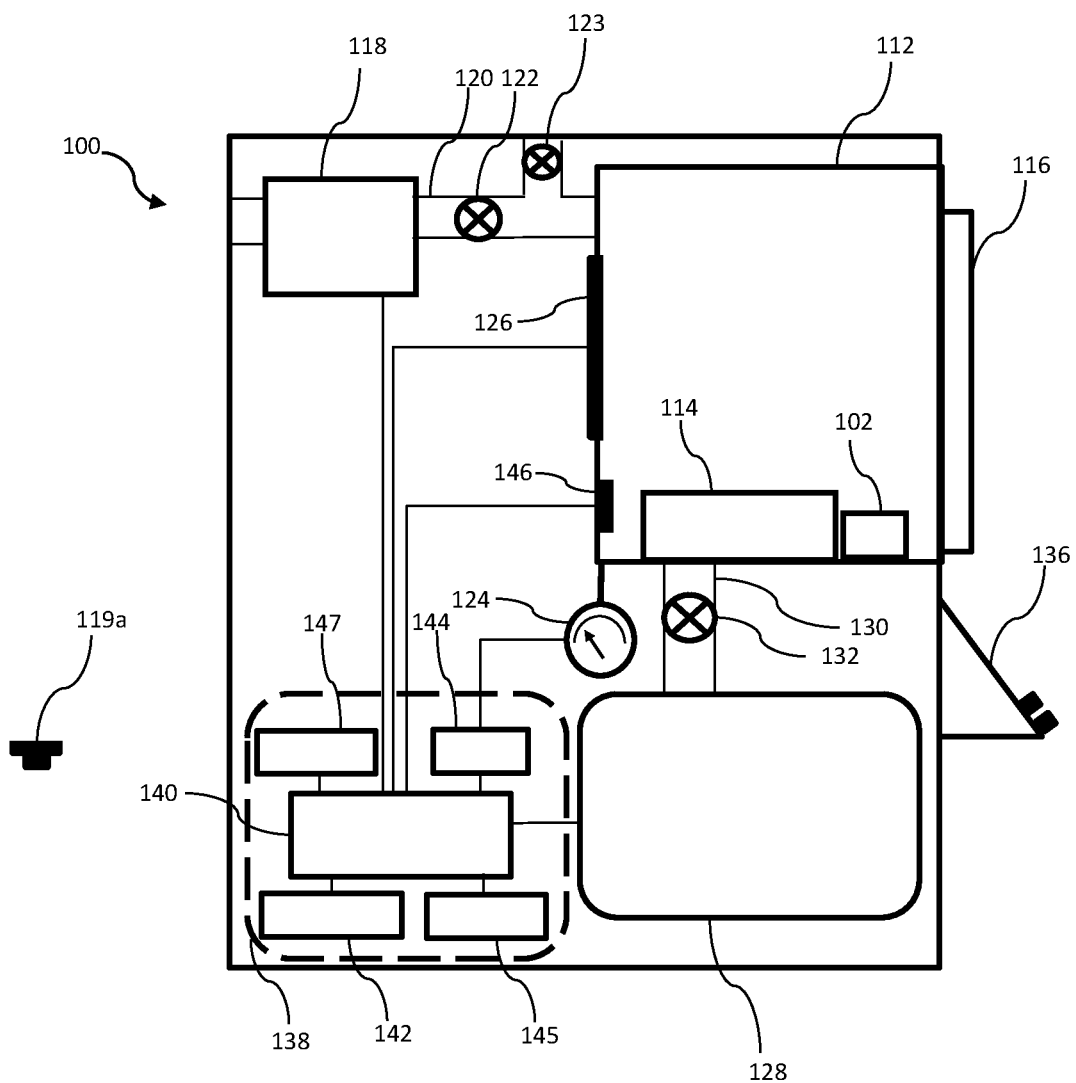
FIG. 1 depicts a schematic representation of a sterilizer where a camera is disposed outside of the sterilizer.
Figure 2:
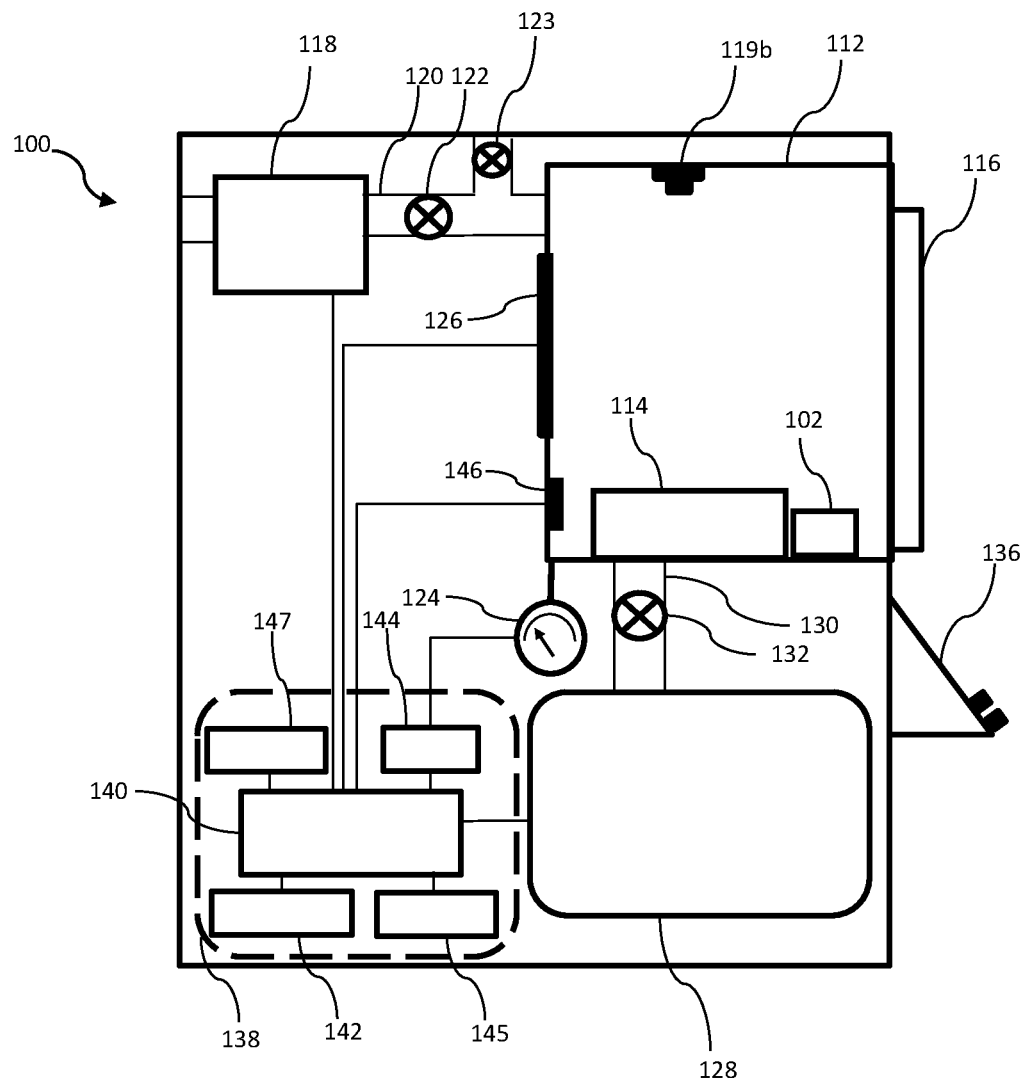
FIG. 2 depicts a schematic representation of the sterilizer of FIG. 1, except that the camera is disposed inside the sterilizer.

A schematic representation of a sterilizer 100, e.g., the STERRAD® 100NX System, is reflected in FIGS. 1 and 2. Sterilizer 100 comprises a vacuum chamber 112, which is configured to maintain a load (pack) 114 of instruments therein to be sterilized. The instruments may be disposed on a sterilization tray such that the load may include the tray. An exemplary load 114 comprising instruments disposed in a sterilization tray is reflected in FIG. 4. As shown, the load comprises the sterilization tray, an endoscope, and two forceps. However, various other instruments may additionally or alternatively comprise load 114, such as graspers, tweezers, or any other reusable medical device.

One or more sterilization indicators (e.g., a biological indicator 102) may be disposed within chamber 112, such as placed adjacent to load 114. The chamber 112 may be formed of any material that is sufficiently robust to handle pressures as low as approximately between 0.3 torr and 3 torr, and sufficiently inert to avoid reacting with or absorbing any sterilants introduced therein. Such materials may include aluminum and stainless steel. Chamber 112 may also include an openable and sealable barrier 116, such as a door, that may be opened to allow placement and removal of load 114 into chamber 112. The barrier should be sufficiently robust, and include a sufficiently robust seal, to withstand low pressures in chamber 112 and avoid leaks between chamber 112 and the ambient environment. A vacuum pump 118 capable of reaching the desired operating pressure evacuates air and other gases, such as water vapor, from chamber 112. Vacuum pump 118 may include a hose or pipe 120 to connect it to chamber 112. Vacuum pump 118 may also include a valve 122, which may be open or closed to assist or prevent pressure changes in chamber 112. For example, when the valve is open and the vacuum pump is operational, the pressure in chamber 112 may be lowered. Alternatively, when the valve is open and the vacuum pump is not operational, pressure in the chamber may be increased toward or equalized to the ambient pressure such that valve 122 may be considered a vent valve. In other embodiments, another vent valve 123 may be used to vent chamber 112. A pressure monitor or transducer 124 measures the pressure in chamber 112. Particularly suitable pressure monitors are capacitance manometers available from MKS Instruments. A heating element 126 may be used to heat the chamber 112. It may comprise separate elements bonded to the outside of the chamber 112 in locations sufficient to uniformly heat the chamber 112. A source of sterilant 128, e.g., a reservoir or a cartridge containing the sterilant (such as hydrogen peroxide or peracetic acid), which may additionally include or be connected to a hose or pipe 130, is connected to chamber 112. In some embodiments, reservoir 128 may further include or be connected to a valve 132, which may be disposed between chamber 112 and source 128 to control the flow of sterilant from source 128 through hose 130 and into chamber 112. Sterilization system 100 may also comprise a user interface 136, which may further include output devices, such as a printer, display, and alarm. User interface 136 may also include input devices, such as a keypad or touch screen. System 100 may also comprise a sterilant monitor 146, e.g., a hydrogen peroxide monitor, capable of monitoring and outputting hydrogen peroxide data.

System 100 may also comprise a camera. For example, as shown in FIG. 1, camera 119a may be a disposed outside of chamber 112. Camera 119a may thus be a standard, off the shelf digital camera, e.g., a Smartphone camera, that provides functionality, e.g., a Bluetooth radio, or a data input/output port (e.g., a USB port) for communicating image data to another device, such as communication module 147. As such, load 114 may be imaged before it is positioned in chamber 112. Alternatively or additionally, as shown in FIG. 2, a camera 119b, or at least a lens thereof, may be disposed in or face into chamber 112 for imaging load 114 after load 114 is positioned in chamber 112. As shown, camera 119b is disposed proximate to the top of chamber 112. However, it may also be disposed proximate to a side or the bottom of chamber 112. Furthermore, multiple cameras 119b may be provided in various positions around chamber 112. Like camera 119a, camera 119b also includes functionality, e.g., a Bluetooth radio, or a data input/output port (e.g., a USB port) for communicating image data to another device, such as communication module 147. In further embodiments, either of cameras 119a and 119b be thermographic cameras or imaging cameras include thermographic functionality such that they may also be used to capture infrared images, which may be used to, e.g., determine a temperature of load 114. In typical usage, load 114 may be wrapped in a sterilization wrap that would prevent camera 119b from capturing an optical image of the instruments. Nonetheless, thermal imaging of the wrapped load after it is disposed in chamber 112 may justify implementation of the system as comprising both camera 119a outside of chamber 112 and camera 119b inside chamber 112.

Figure 3:
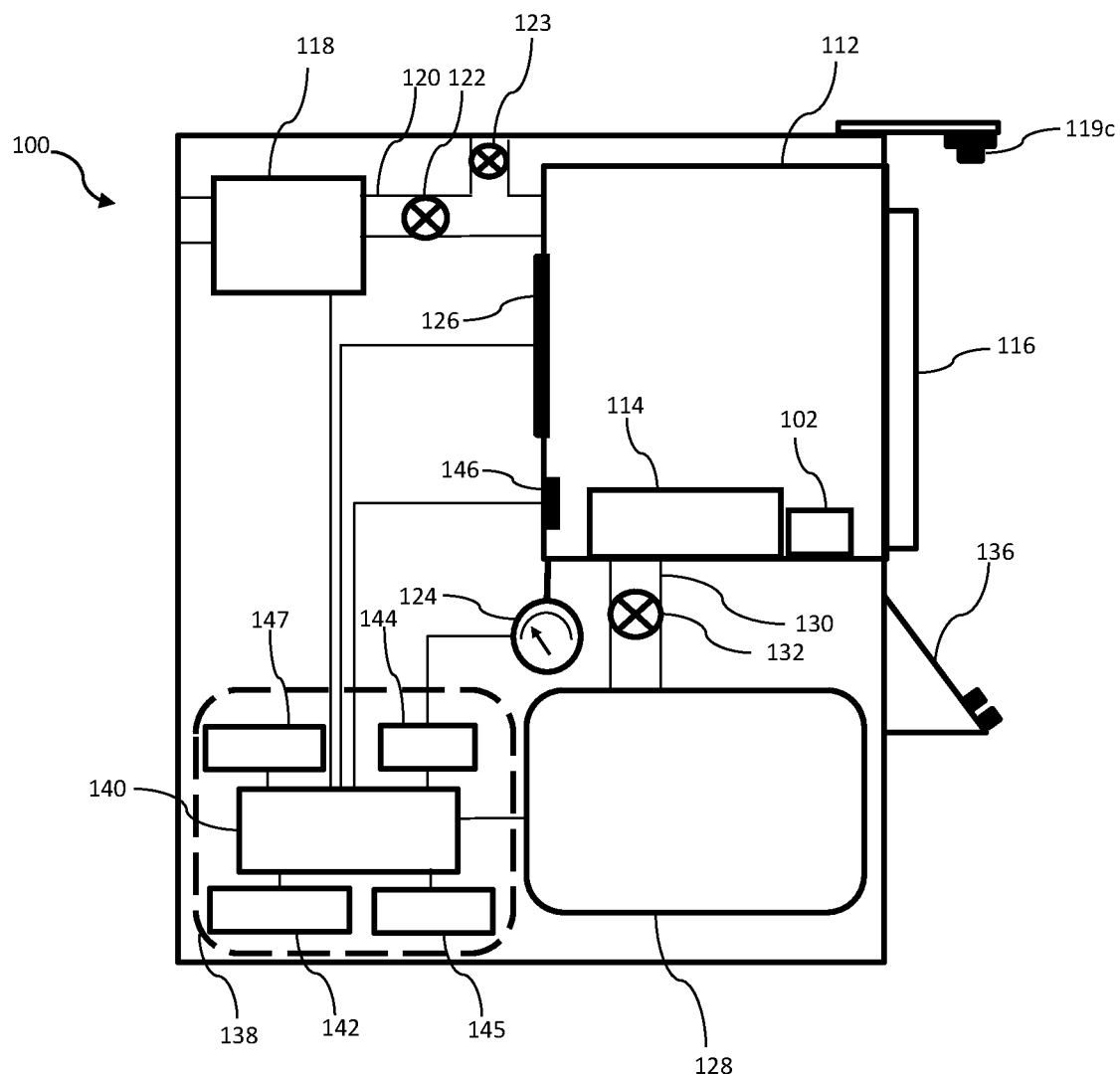
FIG. 3 depicts a schematic representation of the sterilizer of FIG. 1, except that the camera is disposed above a door of the sterilizer.

With reference to FIG. 3, camera 119c is shown as being disposed over door 116, e.g., maintained by a cantilevered support or bar 150. Camera 119c may be used to capture images of load 114 as load 114 is being inserted in chamber 112. Again, because load 114 may be wrapped in a sterilization wrap before it is inserted into chamber 112, camera 119c, like cameras 119a-b, may be a thermographic camera or an imaging camera that includes thermographic functionality such that it may be used to capture infrared images, which may be used to determine a temperature of load 114. Camera 119c, like cameras 119a-b, also includes functionality, e.g., a Bluetooth radio, or a data input/output port (e.g., a USB port) for communicating image data to another device, such as communication module 147.

A control system 138, such as a digital computer, controls the operation of sterilizer 100 and its various components. Control system 138 may employ one or more microprocessors 140. It may also employ a non-transitory storage medium 142, such as random access memory (RAM), a hard-disk drive, or flash memory, which can store, e.g., information and data. An analog to digital (A2D) converter 144 may be used to convert analog data to digital data if analog data, such as pressure data or hydrogen peroxide concentration, is collected. A timer or clock circuit 145 keeps time. Control system 138 may also include a communication module 147 by which control system 138 and its microprocessor 140 may communicate data or information to other computer systems. Communication module 147 may be a standard, commercially available communication module, e.g., a network interface controller, such as an Ethernet or Wi-Fi network controller, by which microprocessor 140 may send or receive data or information from other computers, e.g., remote computers via the Internet. Further, communication module 147 may include a radio, e.g., a Bluetooth radio, or a data input/output port (e.g., a USB port) for communication with other devices, e.g., cameras 119*a-c*. Control system 138 may further include software and/or logic by which microprocessor 140 may determine the volume of load 114 and the amount of time, or approximately the amount of time, needed to reach the threshold AUC based on various characteristics of load 114, e.g., number of instruments, volume, and temperature, as detailed below. Processor 140 may be configured to automatically end a sterilization process upon determining, e.g., that the volume of load 114 is greater than a threshold volume, that the AUC threshold has been met, or that the AUC threshold has not been met within a certain amount of time. For clarity, certain connections between processor 140 and other components of sterilizer 100 are not shown. However, it should be understood that sterilizer 100 is configured such that processor 140 may control all functions of sterilizer 100.

With continuing reference to the STERRAD® 100NX system, this system is capable of performing sterilization procedures under various process parameters, which healthcare personnel may select based on various characteristics of the load, such as if the load might include single-channel flexible endoscopes, flexible endoscopes with cameras, or rechargeable batteries. Most surgical instruments sterilized in the STERRAD® 100NX system are sterilized using the system's Standard Cycle, which lasts approximately forty-seven minutes. The Standard Cycle comprises two half cycles, each of which includes various phases, such as a pump-down phase, a sterilant (hydrogen peroxide) transfer phase, and a plasma phase. In the hydrogen peroxide transfer phases, each of which may be referred to as a transfer phase, hydrogen peroxide begins to be pumped into chamber 112, typically when the pressure in chamber 112 is approximately 0.3 torr. Continued introduction of hydrogen peroxide into chamber 112 causes the pressure and the concentration of hydrogen peroxide in the chamber to increase. In the commercially available version of the STERRAD® 100NX, 5.5 ml of liquid hydrogen peroxide is pumped into chamber 112 over approximately eight minutes. The liquid hydrogen peroxide changes phase to gaseous form due to the low pressure in the chamber or in an evaporator disposed in line between chamber 112 and source 128. The eight minute duration is fixed in the commercially available version of the STERRAD® 100NX based on determinations made by Applicant corresponding to so-called "challenge" loads having large volumes (e.g., greater than or equal to about 5.2 liters) and cold temperatures (e.g., cooler than about 5° C.), referred to herein as challenge-load volumes and challenge-load temperatures. Applicant has determined that within 8 minutes, an AUC of at least 747 mg-sec/L is achieved, which corresponds to a sufficient concentration of hydrogen peroxide being in chamber 112 for a sufficient amount of time to sterilize the challenge loads. However, many loads sterilized in Applicant's commercially available systems have a smaller volume than the challenge-load volume and are warmer than the challenge-load temperature. As such, for these loads, the AUC is commonly achieved in less than eight minutes but the transfer phase nonetheless continues for eight minutes. Conversely, should a load be placed into Applicant's commercially available system that is larger or cooler, than the challenge loads, it would be advantageous to prevent a sterilization cycle from commencing and to instead alert the user.

Accordingly, there is an opportunity to save time and sterilant. Specifically, a sterilization system may be configured to terminate the transfer phase upon determining that a predetermined AUC threshold (e.g., approximately 747 mg-sec/L) has been satisfied or to prevent a sterilization cycle form commencing if processor 140 determines that the predetermined AUC threshold likely will not be achieved. To maximize the value of any time savings to healthcare personnel and their healthcare facility, it is beneficial to communicate the time savings to healthcare personnel before or early in the sterilization process.

Applicant conducted various trials to determine the amount of time required to achieve the predetermined AUC threshold of approximately 747 mg-sec/L during the transfer phase in the STERRAD® 100NX system for loads that are smaller, warmer, or smaller and warmer than the challenge loads. Exemplary data from these trials are presented in Table 1. Loads having volumes and temperatures such as those reported in Table 1 are often sterilized in sterilizers such as the STERRAD® 100NX system.

TABLE 1

| Load volume (L) | Load Weight (lbs) | Load Temperature (C.) | Time to reach AUC in transfer phase (mins) | Procedure duration (mins) |
| --- | --- | --- | --- | --- |
| 5.220 | 22.43 | 18 | 6.28 | 43.6 |
|  |  | 25 | 4.82 | 40.6 |
|  |  | 35 | 3.38 | 37.8 |
| 5.067 | 19.08 | 18 | 6.8 | 44.6 |
|  |  | 25 | 4.82 | 40.6 |
|  |  | 35 | 3.35 | 37.7 |
| 2.732 | 10.98 | 18 | 5.4 | 41.8 |
|  |  | 25 | 3.83 | 38.7 |
|  |  | 35 | 2.87 | 36.7 |
| 2.213 | 8.09 | 18 | 4.83 | 40.7 |
|  |  | 25 | 3.3 | 37.6 |
|  |  | 35 | 2.85 | 36.7 |

Because the transfer phase in the commercially available STERRAD® 100NX lasts approximately eight minutes, and because two transfer phases are performed during the Standard Cycle, overall time savings in the Standard Cycle may be calculated as twice the difference between the eight minutes and the time to reach the AUC reported in table 1. As such, the current overall default duration of 47 minutes for the standard cycle may be reduced by this amount, as also reported in Table 1. Notably, the reported trials lasted for a duration of substantially less time than the default 47 minutes, up to about 22% less time. The time savings may be even greater for less challenging loads, e.g., loads having temperature that is greater than approximately 35° C. and that are smaller than 2.2 liters.

Based on the foregoing, information that correlates load volume to procedure durations may be input into and stored in storage medium 142. Such information may be provided, e.g., as a lookup table or function of best fit. Such information may also correlate load temperature, load weight, or both to procedure durations. Accordingly, upon determining the characteristics of the load that have been correlated to procedure duration and ability to reach the target AUC, processor 140 may determine the expected duration of the overall sterilization process and report it to healthcare personnel via user interface 136. Additionally or alternatively, processor 140 may use the volume and temperature data to dynamically adjust various parameters of the sterilization process, such as changing from defaults: the volume of sterilant introduced into chamber 112, the concentration of hydrogen peroxide required achieve sterilization, the duration of the sterilization cycle, or a pressure at which the sterilant is introduced into chamber 112.

Determination of characteristics of load 114 may be accomplished as described in Applicant's copending U.S. Patent Application 62/826,695, filed Mar. 29, 2019. Furthermore, cameras 119*a-c* may be used to capture visual images, thermal images, or both types of images of load 114. The visual images may be used to determine the volume of load 114, the number of instruments in load 114, and the type of instruments in load 114. The thermal images may be used to determine the temperature of load. Such determinations may be made by processor 140, or by a remote computer system that receives the images taken by cameras, and sent by processor 140 via communication module 147 to a remote system for processing.

For example, processor 140 or a remote system may be able to compare images of load 114 to a database of images of instruments (e.g., stored in storage medium 142) in order to determine the characteristics of load 114, such as the type of instruments in a load, the number of diffusion-restricted spaces (such as lumens) in each instrument, the materials of each instrument, the number of instruments in the load, and the overall volume of the load, including or not including a tray. In other words, machine vision techniques known in the art may be employed to determine characteristics of load 114. Processing of images for machine-vision purposes may be performed by processor 140 or remotely if it is determined that additional processing power may be desirable (e.g., faster than processor 140). Certain cloud services, including those offered by Google, might be used for remote processing of images as reflected at Google, Vision AI, https://cloud.google.com/vision/, last visited Sep. 5, 2019. Alternatively or additionally, in those embodiments where camera 119*a* is a Smartphone camera, the Smartphone may additionally or alternatively provide storage and processing functionality. As such, the Smartphone may be used to image the load, process images, and determine any or all of the load characteristics described herein.

Applicant has devised methods and variations of operating a sterilizer having a chamber (vacuum chamber or sterilization chamber) based on determinations of characteristics of load 114 from images of load 114. As reflected in FIG. 5, one such exemplary method 200 begins at step 202, which comprises disposing a load of between one and ten instruments on a sterilization tray. Next, at step 204, the load is imaged to obtain an image of the load. In certain variations, the load may be imaged before it and the tray are disposed inside the chamber. In other variations, the load may be imaged after it and the tray are disposed inside the chamber. In further variations, the load may be imaged both before and after it and the tray are disposed inside the chamber.

At step 206, characteristics of the load that may be determined by the imaging techniques described herein. These characteristics may include, among other things, the number of instruments (e.g., between one and ten), the presence of a diffusion-restricted space in an instrument (e.g., a gap between neighboring components or a lumen), the type of instruments in each load (e.g., an endoscope), the material of the instruments in the load (e.g., metallic or polymeric, or even more specifically, e.g., polyethylene or polytetrafluoroethylene), the volume of the load, and the temperature of the load. As such, the first characteristic of the load may comprise the first instrument having a diffusion-restricted space. For example, the first instrument may include the diffusion-restricted space. Further for example, the first instrument may include a lumen, a camera, or both. Additionally, the first instrument may be an endoscope, and which may additionally include a camera, or may include only a single lumen. Any lumens in the instruments, e.g., the first instrument, may have a diameter of greater than about 0.7 millimeters and less than about 10 millimeters (e.g., greater than about one millimeter). Additionally or alternatively, these lumens may have a length of less than about 1000 millimeters, less than about 850 millimeters, or less than about 500 millimeters.

In as much as the load may include between one and ten instruments, the first characteristic of the load may also include the load having a second instrument. The second instrument may be similar to the first instrument, such that the second instrument may be considered a second instance of the first instrument (e.g., another endoscope of the same model). Alternatively, the second instrument may be different from the first instrument. Thus, for example, the second instrument may comprise a forceps, a camera, or a battery. At step 210, a sterilization cycle may be selected based on the first characteristic of the load, e.g., number of instruments, types of instruments, and diffusion-restricted spaces of the instruments, Each of the sterilization cycles that may be performed by the sterilizer, and that may be selected based on at least the first characteristic of the load as determined from the image, include a step in which a default amount of sterilant is introduced into the chamber such that the load becomes exposed to the default amount of the sterilant, which may be, e.g., hydrogen peroxide (as utilized in the STERRAD® 100NX System) or peracetic acid. In these cycles, the load may be exposed to the default amount of the sterilant for a default amount of time or default duration. In a first cycle, the default duration may be between about fifty minutes and about seventy minutes, e.g., about sixty minutes. In a second cycle, the default duration may be between about forty minutes and about fifty minutes, e.g., about forty-seven minutes or about forty-two minutes. In a third cycle, the default duration may be between about twenty minutes and thirty minutes, e.g., about twenty-four minutes. However, as noted above, these durations may correspond to challenge loads such that the method may include, at step 212, adjusting parameters of the sterilization cycle by, e.g., reducing the duration of the cycle from the default duration by between about 0.5% percent and about 25% percent (e.g., about 5%, about 10%, about 15%, or about 20%) based on the first, second, and third characteristics of the load, e.g., upon a determination that the load is less challenging to sterilize than a challenge load because, for example, the load includes fewer instruments than the challenge load, is warmer than the challenge load, has a smaller volume than the challenge load, or includes fewer diffusion-restricted spaces than the challenge load. On the other hand, at step 214, following a determination at step 208 that the load is more challenging to sterilize than a challenge load because, e.g., the load includes more instruments (e.g., two or five) than the challenge load, is cooler than the challenge load, has a greater volume than the challenge load, or includes more diffusion-restricted spaces, or diffusion-restricted spaces that are more restricted than those of the challenge loads, the sterilization cycle may be aborted or prevented from being started.

In particular variations of the method, the second characteristic of the load may be determined from the image of the load, such that the cycle may be adjusted at step 212 based on the second characteristic. In particular, the second characteristic may be a volume of the load. Where the volume of the load is determined to be less than the volume of a challenge load, e.g., less than about 5.2 liters, the duration of the cycle may be reduced from the default duration by between about 0.5% and about 25%. On the other hand, where the volume of the load is determined to be greater than about 5.2 liters, the sterilization cycle may be aborted or prevented from commencing at step 214.

In further particular variations of the method, the third characteristic of the load may be determined from the image of the load such that the cycle may be adjusted at step 212 based on the third characteristic. In particular, the third characteristic may be a temperature of the load. Where the temperature of the load is determined to be greater than the temperature of a challenge load, e.g., greater than about 5° C., the duration of the cycle may be reduced from the default duration by between about 0.5% and about 25%. On the other hand, where the temperature of the load is determined to be less than the temperature of a challenge load, e.g., less than about 5° C., the sterilization cycle may be aborted or prevented from commencing at step 214.

Additional adjustments to the sterilization cycle may also be made at step 212 based on any one or more of the first characteristic, second characteristic, or third characteristic. For example, the standard or default pressure of the chamber at which the sterilant is typically introduced therein is less than about 1 torr, e.g., about 0.3 torr. As such, for loads that are less challenging to sterilize than challenge loads, e.g., small loads or hot loads, the pressure in the chamber may be maintained at an operating pressure having a pressure that is greater than the default pressure such that the sterilant may be introduced into the chamber at the operating pressure and such that the instruments may be exposed to the sterilant at the operating pressure.

After any adjustments to the cycle are completed at step 212, the sterilization cycle may be commenced at step 216.

At step 206, the processor (e.g., 140) may be used to determine the first characteristic of the load, the second characteristic of the load, and the third characteristic of the load based on the image of the load. Additionally or alternatively, the processor may send the image of the load to a remote system such that the remote system may additionally or alternatively determine the first characteristic of the load, the second characteristic of the load, and the third characteristic of the load based on the image of the load. In those variations where a remote system determines the characteristics, the processor also receives a determination of the characteristics from the remote system. Whatever the case, the processor selects the sterilization cycle at step 210, such that the user need not select the cycle, eliminating a possible source of user error. Additionally or alternatively, the processor causes the adjustments to the sterilization cycle (e.g., duration, operating pressure, amount of sterilant) at step 212 based on the characteristics.

Any of the examples or embodiments described herein may include various other features in addition to or in lieu of those described above. The teachings, expressions, embodiments, examples, etc., described herein should not be viewed in isolation relative to each other. Various suitable ways in which the teachings herein may be combined should be clear to those skilled in the art in view of the teachings herein.

Having shown and described exemplary embodiments of the subject matter contained herein, further adaptations of the methods and systems described herein may be accomplished by appropriate modifications without departing from the scope of the claims. In addition, where methods and steps described above indicate certain events occurring in certain order, it is intended that certain steps do not have to be performed in the order described but in any order as long as the steps allow the embodiments to function for their intended purposes. Therefore, to the extent there are variations of the invention, which are within the spirit of the disclosure or equivalent to the inventions found in the claims, it is the intent that this patent will cover those variations as well. Some such modifications should be apparent to those skilled in the art. For instance, the examples, embodiments, geometrics, materials, dimensions, ratios, steps, and the like discussed above are illustrative. Accordingly, the claims should not be limited to the specific details of structure and operation set forth in the written description and drawings.

We claim:

1. A method of sterilizing a load in a sterilizer comprising:
   imaging the load, via a camera, to generate an image of the load;
   determining, via the sterilizer, a characteristic of the load from the image of the load; and
   selecting, via the sterilizer, a sterilization cycle from a plurality of sterilization cycles based on the characteristic of the load.

2. The method of claim 1, wherein the characteristic includes the number of instruments in the load and further comprising the step of reducing a duration of a sterilization cycle by between about 0.5% and about 25% based on determining that the number of instruments in the load is fewer than a number of instruments in a challenge load.

3. The method of claim 1, wherein the characteristic includes a volume of the load and further comprising the step of reducing a duration of a sterilization cycle by between about 0.5% and about 25% based on determining that the volume of the load is less than a volume of a challenge load.

4. The method of claim 3, further comprising reducing a pressure in a chamber of the sterilizer to an operating pressure that is greater than a default pressure based on determining that the volume of the load is less than the volume of the challenge load.

5. The method of claim 1, wherein the characteristic includes a volume of the load and further comprising the step of preventing the sterilization cycle from commencing after determining that the volume of the load is greater than the volume of a challenge load.

6. The method of claim 1, wherein the characteristic includes a temperature of the load and further comprising the step of reducing a duration of a sterilization cycle by between about 0.5% and about 25% based on determining that the temperature of the load is greater than the temperature of a challenge load.

7. The method of claim 1, wherein the characteristic includes a temperature of the load and further comprising the step of preventing the sterilization cycle from commencing after determining that the temperature of the load is less than a temperature of a challenge load.

8. The method of claim 1, further comprising the step of comparing the image of the load to the images of instruments in a database.

9. The method of claim 1, wherein the sterilizer includes a chamber configured to receive the load and a processor configured to select the sterilization cycle based on the characteristic of the load.

10. The method of claim 1, wherein the characteristic of the load includes at least one of the type of instruments in the load, the number of diffusion-restricted spaces in each instrument, the materials of each instrument, the number of instruments in the load and the overall volume of the load.

11. The method of claim 1, wherein the load includes at least one instrument and a tray.

12. The method of claim 1, wherein the determining step includes determining a plurality of characteristics of the load and the selecting step is based on the plurality of characteristics.

13. A sterilizer, comprising:
- a processor;
- a chamber coupled to the processor and configured to receive a load; and
- a camera coupled to the process and configured to obtain an image of the load, before or after the load is received in the chamber,
- wherein the processor is configured to select a sterilization cycle based on a characteristic of the load determined from the image of the load.

14. The sterilizer of claim 13, wherein the camera is disposed outside the sterilizer.

15. The sterilizer of claim 13, wherein the camera is disposed in the chamber.

16. The sterilizer of claim 13, wherein the camera is a thermographic camera.

17. The sterilizer of claim 13, wherein the camera is an imaging camera having thermographic functionality.

18. The sterilizer of claim 13, wherein the characteristic of the load includes at least one of the type of instruments in the load, the number of diffusion-restricted spaces in each instrument, the materials of each instrument, the number of instruments in the load and the overall volume of the load.

19. The sterilizer of claim 13, wherein the processor is configured to reduce the duration of a sterilization cycle by between about 0.5% and about 25% based on the characteristic.

20. The sterilizer of claim 13, wherein the processor is configured to prevent the sterilization cycle from commencing based on the characteristic.

* * * * *